US008565123B2

(12) United States Patent
Khan et al.

(10) Patent No.: US 8,565,123 B2
(45) Date of Patent: Oct. 22, 2013

(54) SYSTEM AND METHOD FOR RUNNING A MULTIPLE SPANNING TREE PROTOCOL WITH A VERY LARGE NUMBER OF DOMAINS

(75) Inventors: Tameen Khan, Santa Clara, CA (US); Ronak Desai, Fremont, CA (US); Shekher Bulusu, Fremont, CA (US); Francois Edouard Tallet, Santa Clara, CA (US); Norman W. Finn, Livermore, CA (US); Munish Mehta, Fremont, CA (US)

(73) Assignee: Cisco Technology, Inc., San Jose, CA (US)

( * ) Notice: Subject to any disclaimer, the term of this patent is extended or adjusted under 35 U.S.C. 154(b) by 1699 days.

(21) Appl. No.: 11/416,559

(22) Filed: May 3, 2006

(65) Prior Publication Data

US 2007/0258390 A1 Nov. 8, 2007

(51) Int. Cl.
H04L 12/28 (2006.01)

(52) U.S. Cl.
USPC ...... 370/256; 370/395.53; 370/400; 370/401; 370/428

(58) Field of Classification Search
None
See application file for complete search history.

(56) References Cited

U.S. PATENT DOCUMENTS

| 5,394,402 | A | 2/1995 | Ross |
| 5,742,604 | A | 4/1998 | Edsall et al. |
| 6,035,105 | A | 3/2000 | McCloghrie et al. |
| 6,188,694 | B1 | 2/2001 | Fine et al. |
| 6,219,699 | B1 | 4/2001 | McCloghrie et al. |
| 6,304,901 | B1 | 10/2001 | McCloghrie et al. |
| 6,628,624 | B1 | 9/2003 | Mahajan et al. |
| 6,741,592 | B1 | 5/2004 | Edsall et al. |
| 6,813,250 | B1 | 11/2004 | Fine et al. |
| 6,934,262 | B1 | 8/2005 | Lau et al. |
| 6,937,576 | B1 | 8/2005 | Di Benedetto et al. |
| 6,976,088 | B1 | 12/2005 | Gai et al. |
| 6,987,740 | B1 | 1/2006 | Di Benedetto et al. |

(Continued)

OTHER PUBLICATIONS

IEEE Std. 802.1D—1998 Edition, Information Technology—Telecommunications and Information Exchange Between Systems—Local and Metropolitan Area Networks—Common Specifications—Part 3: Media Access Control (MAC) Bridges, IEEE, 1998, pp. 1-355.
IEEE Std. 802.1D—2004, IEEE Standard for Local and Metropolitan Area Networks—Media Access Control (MAC) Bridges, IEEE, Jun. 2004, pp. 1-269.

(Continued)

*Primary Examiner* — Jae Y Lee
(74) *Attorney, Agent, or Firm* — Novak Druce Connolly Bove + Quigg, LLP

(57) ABSTRACT

A system and method runs a multiple spanning tree protocol (MSTP) in a computer network having a very large number of bridge domains. The computer network includes a plurality of intermediate network devices, each having a plurality of ports for forwarding network messages. Within each device, a plurality of bridge domains are defined, each bridge domain is identified by a Virtual Local Area Network (VLAN) Identifier (VID), and one or more device ports. For each port, a separate mapping of VIDs to Multiple Spanning Tree Instances (MSTIs), based on the bridge domains defined at the port, is established. Each mapping is converted to a port-based configuration digest, which is entered into Spanning Tree Protocol (STP) control messages sent from the respective port. Ports receiving STP control messages whose configuration digest values that match the configuration digests values computed for the ports are said to be in the same Multiple Spanning Tree region. Ports whose configuration digests differ from the configuration digests of received STP control messages are said to be in different regions.

20 Claims, 9 Drawing Sheets

(56) References Cited

U.S. PATENT DOCUMENTS

| | | | |
|---|---|---|---|
| 7,512,078 B2* | 3/2009 | Swain et al. | 370/254 |
| 2003/0152075 A1* | 8/2003 | Hawthorne et al. | 370/389 |
| 2004/0081171 A1* | 4/2004 | Finn | 370/395.53 |
| 2005/0149625 A1* | 7/2005 | Rouyer et al. | 709/220 |
| 2005/0152289 A1* | 7/2005 | Nagata et al. | 370/256 |
| 2006/0007939 A1* | 1/2006 | Elangovan | 370/395.53 |
| 2006/0120389 A1* | 6/2006 | Sampath et al. | 370/401 |
| 2006/0182133 A1* | 8/2006 | Choumaru et al. | 370/401 |
| 2007/0258390 A1* | 11/2007 | Khan et al. | 370/256 |

OTHER PUBLICATIONS

IEEE Std. 802.1Q—2003, IEEE Standards for Local and Metropolitan Area Networks—Virtual Bridged Local Area Networks, IEEE, May 7, 2003, pp. 1-327.

IEEE Std. 802.1Q—1998, IEEE Standards for Local and Metropolitan Area Networks—Virtual Bridged Local Area Networks, IEEE, Dec. 8, 1998, pp. 1-211.

IEEE Std. 802.1Q—2005, IEEE Standards for Local and Metropolitan Area Networks—Virtual Bridged Local Area Networks—Revision, IEEE, Sep. 12, 2005, pp. 1-185.

* cited by examiner

| PORT BRIDGE DOMAIN TO VLAN TABLE | |
|---|---|
| BRIDGE DOMAIN | VLAN ID |
| 8001 | 1 |
| 8002 | 2 |
| 8003 | 3 |
| 12094 | 4094 |
| 12095 | 4095 |
| 12096 | 4096 |

FIG. 6

| GLOBAL BRIDGE DOMAIN TO VLAN TABLE | |
|---|---|
| BRIDGE DOMAIN | VLAN ID |
| 1 | 1 |
| 2 | 2 |
| 3 | 3 |
| 4 | 4 |
| ... | ... |
| 4095 | 4095 |
| 4096 | 4096 |
| 4097 | 1 |
| 4098 | 2 |
| 4099 | 3 |
| ... | ... |
| 8001 | 1 |
| 8002 | 2 |
| 8003 | 3 |
| ... | ... |
| 12094 | 4094 |
| 12095 | 4095 |
| 12096 | 4096 |
| 12097 | 4096 |
| ... | ... |
| 16382 | NOT USED |
| 16383 | NOT USED |
| 16384 | NOT USED |

FIG. 7

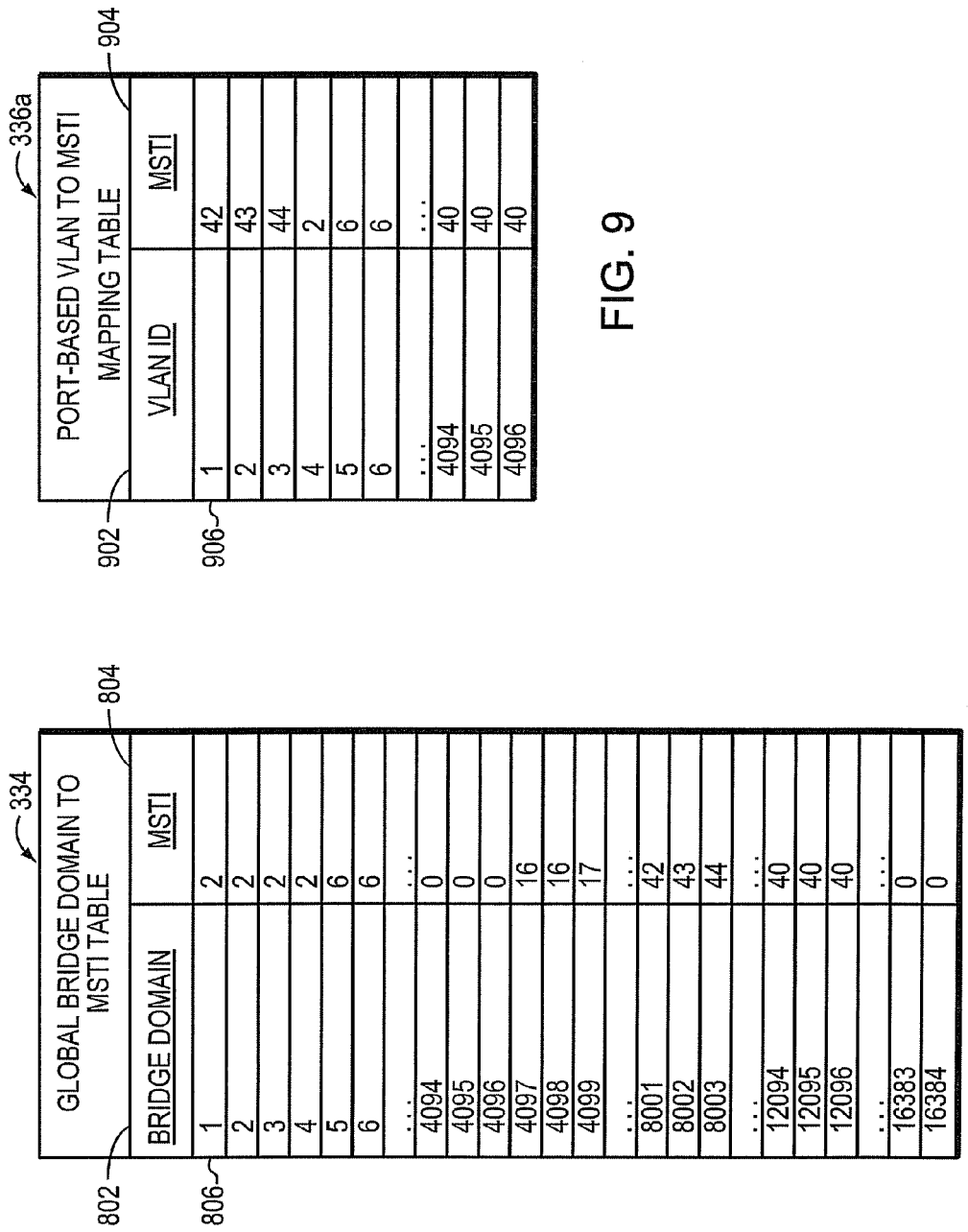

SYSTEM AND METHOD FOR RUNNING A MULTIPLE SPANNING TREE PROTOCOL WITH A VERY LARGE NUMBER OF DOMAINS

BACKGROUND OF THE INVENTION

1. Field of the Invention

The present invention relates generally to computer networks, and more specifically, to a system and method for supporting a large number of broadcast domains within the network.

2. Background Information

Many organizations, including businesses, governments and educational institutions, utilize computer networks so that employees and others may share and exchange information and/or resources. A computer network typically comprises a plurality of entities interconnected by means of one or more communications media. An entity may consist of any device, such as a computer, that "sources" (i.e., transmits) or "sinks" (i.e., receives) data frames over the communications media. A common type of computer network is a local area network ("LAN") which typically refers to a privately owned network within a single building or campus. LANs typically employ a data communication protocol (LAN standard), such as Ethernet, or a wireless protocol, that defines the functions performed by data link and physical layers of a communications architecture (i.e., a protocol stack).

One or more intermediate network devices are often used to couple LANs together and allow the corresponding entities to exchange information. For example, a bridge may be used to provide a "switching" function between two or more LANs or end stations. Typically, the bridge is a computer and includes a plurality of ports that are coupled via LANs either to other bridges, or to end stations such as routers or host computers. Ports used to couple bridges to each other are generally referred to as a trunk ports, whereas ports used to couple bridges to end stations are generally referred to as access ports. The bridging function includes receiving data from a sending entity at a source port and transferring that data to at least one destination port for forwarding to one or more receiving entities.

Spanning Tree Algorithm

Most computer networks include redundant communications paths so that a failure of any given link does not isolate any portion of the network. Such networks are typically referred to as meshed or partially meshed networks. The existence of redundant links, however, may cause the formation of circuitous paths or "loops" within the network. Loops are highly undesirable because data frames may traverse the loops indefinitely.

Furthermore, some devices, such as bridges or switches, replicate frames whose destination is not known resulting in a proliferation of data frames along loops. The resulting traffic can overwhelm the network. Other intermediate devices, such as routers, that operate at higher layers within the protocol stack, such as the Internetwork Layer of the Transmission Control Protocol/Internet Protocol ("TCP/IP") reference model, deliver data frames and learn the addresses of entities on the network differently than most bridges or switches, such that routers are generally not susceptible to sustained looping problems.

To avoid the formation of loops, most bridges and switches execute a spanning tree protocol which allows them to calculate an active network topology that is loop-free (i.e., a tree) and yet connects every pair of LANs within the network (i.e., the tree is spanning). The IEEE promulgated a standard (IEEE Std. 802.1D-1998™) that defines a spanning tree protocol to be executed by 802.1D compatible devices. In general, by executing the 802.1D spanning tree protocol, bridges elect a single bridge within the bridged network to be the "Root Bridge". The 802.1D standard takes advantage of the fact that each bridge has a unique numerical identifier (bridge ID) by specifying that the Root Bridge is the bridge with the lowest bridge ID. In addition, for each LAN coupled to any bridge, exactly one port (the "Designated Port") on one bridge (the "Designated Bridge") is elected. The Designated Bridge is typically the one closest to the Root Bridge. All ports on the Root Bridge are Designated Ports, and the Root Bridge is the Designated Bridge on all the LANs to which it has ports.

Each non-Root Bridge also selects one port from among its non-Designated Ports (its "Root Port") which gives the lowest cost path to the Root Bridge. The Root Ports and Designated Ports are selected for inclusion in the active topology and are placed in a forwarding state so that data frames may be forwarded to and from these ports and thus onto the LANs interconnecting the bridges and end stations of the network. Ports not included within the active topology are placed in a blocking state. When a port is in the blocking state, data frames will not be forwarded to or received from the port. A network administrator may also exclude a port from the spanning tree by placing it in a disabled state.

To obtain the information necessary to run the spanning tree protocol, bridges exchange special messages called configuration bridge protocol data unit (BPDU) messages or simply BPDUs. BPDUs carry information, such as assumed root and lowest root path cost, used in computing the active topology. More specifically, upon start-up, each bridge initially assumes itself to be the Root Bridge and transmits BPDUs accordingly. Upon receipt of a BPDU from a neighboring device, its contents are examined and compared with similar information (e.g., assumed root and lowest root path cost) stored by the receiving bridge in memory. If the information from the received BPDU is "better" than the stored information, the bridge adopts the better information and uses it in the BPDUs that it sends (adding the cost associated with the receiving port to the root path cost) from its ports, other than the port on which the "better" information was received. Although BPDUs are not forwarded by bridges, the identifier of the Root Bridge is eventually propagated to and adopted by all bridges as described above, allowing them to select their Root Port and any Designated Port(s).

In order to adapt the active topology to changes and failures, the Root Bridge periodically (e.g., every hello time) transmits BPDUs. In response to receiving BPDUs on their Root Ports, bridges transmit their own BPDUs from their Designated Ports, if any. Thus, BPDUs are periodically propagated throughout the bridged network, confirming the active topology. As BPDU information is updated and/or timed-out and the active topology is re-calculated, ports may transition from the blocking state to the forwarding state and vice versa. That is, as a result of new BPDU information, a previously blocked port may learn that it should be in the forwarding state (e.g., it is now the Root Port or a Designated Port).

Rapid Spanning Tree Protocol

Recently, the IEEE issued a new version of the 802.1D standard, known as IEEE Std. 802.1D-2004, that describes a rapid spanning tree protocol (RSTP) to be executed by 802.1D compatible devices. The RSTP similarly selects one bridge of a bridged network to be the root bridge and defines an active topology that provides complete connectivity among the LANs while severing any loops. Each individual port of each bridge is assigned a port role according to whether the port is to be part of the active topology. The port roles defined by the 802.1D-2004 standard include Root, Designated, Alternate and Backup. The bridge port offering the best, e.g., lowest cost, path to the root is assigned the Root Port Role. Each bridge port offering an alternative, e.g., higher cost, path to the root is assigned the Alternate Port Role. Each bridge port providing the lowest cost path from a given LAN is assigned the Designated Port Role, while all other ports coupled to the given LAN in loop-back fashion are assigned the Backup Port Role.

Those ports that have been assigned the Root Port and Designated Port Roles are placed in the forwarding state, while ports assigned the Alternate and Backup Roles are placed in a state. A port assigned the Root Port Role can be rapidly transitioned to the forwarding state provided that all of the ports assigned the Alternate Port Role are placed in the blocking state. Similarly, if a failure occurs on the port currently assigned the Root Port Role, a port assigned the Alternate Port Role can be reassigned to the Root Port Role and rapidly transitioned to the forwarding state, provided that the previous Root Port has been transitioned to the discarding or blocking state. A port assigned the Designated Port Role or a Backup Port that is to be reassigned to the Designated Port Role can be rapidly transitioned to the forwarding state, provided that the roles of the ports of the downstream bridge are consistent with this port being assigned the Designated Port Role. The RSTP provides an explicit handshake to be used by neighboring bridges to confirm that a new Designated Port can rapidly transition to the forwarding state.

Like the STP described in the 1998 version of the 802.1D specification standard, bridges running RSTP also exchange BPDUs in order to determine which roles to assign to the bridge's ports. The BPDUs are also utilized in the handshake employed to rapidly transition Designated Ports to the forwarding state.

Virtual Local Area Networks

A computer network may also be segmented into a series of logical domains. For example, U.S. Pat. No. 5,394,402, issued Feb. 28, 1995 to Ross (the "'402 Patent"), discloses an arrangement for associating any port of a switch with any particular network segment. Specifically, according to the '402 Patent, any number of physical ports of a particular switch may be associated with any number of groups within the switch by using a virtual local area network (VLAN) arrangement that virtually associates the port with a particular VLAN designation. More specifically, the switch or hub associates VLAN designations with its ports and further associates those VLAN designations with messages transmitted from any of the ports to which the VLAN designation has been assigned.

The VLAN designation for each port is stored in a memory portion of the switch such that every time a message is received on a given access port the VLAN designation for that port is associated with the message. Association is accomplished by a flow processing element which looks up the VLAN designation in the memory portion based on the particular access port at which the message was received. In many cases, it may be desirable to interconnect a plurality of these switches in order to extend the VLAN associations of ports in the network. Those entities having the same VLAN designation function as if they are all part of the same LAN. VLAN-configured bridges are specifically configured to prevent message exchanges between parts of the network having different VLAN designations in order to preserve the boundaries of each VLAN. Nonetheless, intermediate network devices operating above L2, such as routers, can relay messages between different VLAN segments.

In addition to the '402 Patent, the IEEE promulgated the 802.1Q specification standard for Virtual Bridged Local Area Networks. To preserve VLAN associations of messages transported across trunks or links in VLAN-aware networks, both Ross and the IEEE Std. 802.1Q-2003 specification standard disclose appending a VLAN identifier (VID) field to the corresponding frames. In addition, U.S. Pat. No. 5,742,604 to Edsall et al. (the "'604 patent"), which is commonly owned with the present application, discloses an Interswitch Link (ISL) encapsulation mechanism for efficiently transporting packets or frames, including VLAN-modified frames, between switches while maintaining the VLAN association of the frames. In particular, an ISL link, which may utilize the Fast Ethernet standard, connects ISL interface circuitry disposed at each switch. The transmitting ISL circuitry encapsulates the frame being transported within an ISL header and ISL error detection information, while the ISL receiving circuitry strips off this information and recovers the original frame.

Multiple Spanning Tree Protocol

Within the IEEE Std. 802.1Q-2003, the IEEE also included a specification standard for a Spanning Tree Protocol that is specifically designed for use with networks that support VLANs. The Multiple Spanning Tree Protocol (MSTP), which is described in the IEEE 802.1s supplement to IEEE Std. 802.1Q-2003, organizes a bridged network into regions. Within each region, MSTP establishes an Internal Spanning Tree (IST) which provides connectivity to all bridges within the respective region and to the ISTs established within other regions. The IST established within each MSTP Region also provides connectivity to the one Common Spanning Tree (CST) established outside of the MSTP regions by IEEE Std. 802.1Q-1998 compatible bridges running STP or RSTP. The IST of a given MST Region receives and sends BPDUs to the CST. Accordingly, all bridges of the bridged network are connected by a single Common and Internal Spanning Tree (CIST). From the point of view of the legacy or IEEE Std. 802.1Q-1998 bridges, moreover, each MST Region appears as a single virtual bridge on the CST.

Within each MST Region, the MSTP compatible bridges establish a plurality of active topologies, each of which is called a Multiple Spanning Tree Instance (MSTI). The MSTP bridges also assign or map each VLAN to one and only one of the MSTIs. Because VLANs may be assigned to different MSTIs, frames associated with different VLANs can take different paths through an MSTP Region. The bridges may, but typically do not, compute a separate topology for every single VLAN, thereby conserving processor and memory resources. Each MSTI is basically a simple RSTP instance that exists only inside the respective Region, and the MSTIs do not interact outside of the Region.

MSTP, like the other spanning tree protocols, uses BPDUs to establish the ISTs and MSTIs as well as to define the boundaries of the different MSTP Regions. The bridges do not send separate BPDUs for each MSTI. Instead, every MSTP BPDU carries the information needed to compute the active topology for all of the MSTIs defined within the respective Region. Each MSTI, moreover, has a corresponding Identifier (ID) and the MSTI IDs are encoded into the bridge IDs. That is, each bridge has a unique ID, as described above, and this ID is made up of a fixed portion and a settable portion. With MSTP, the settable portion of a bridge's ID is further organized to include both a settable priority component and a system ID extension. The system ID extension corresponds to the CIST or one of the MSTI IDs. The MSTP compatible bridges within a given Region will thus have a different bridge ID for the CIST and each MSTI. For a given MSTI, the bridge having the lowest bridge ID for that instance is elected the root. Thus, an MSTP compatible bridge may be the root for one MSTI but not another within a given MSTP Region.

Each bridge running MSTP also has a single MST Configuration Identifier (ID) that consists of three attributes: an alphanumeric configuration name, a revision level and a VLAN mapping table that associates each of the potential 4096 VLANs to a corresponding MSTI. Each bridge, moreover loads its MST Configuration ID into the BPDUs sourced by the bridge. Because bridges only need to know whether or not they are in the same MST Region, they do not propagate the actual VLAN to MSTI tables in their BPDUs. Instead, the MST BPDUs carry only a digest of the VLAN to MSTI table or mappings. The digest is generated by applying the well-know MD-5 algorithm to the VLAN to MSTI table. When a bridge receives an MST BPDU, it extracts the MST Configuration ID contained therein, including the digest, and compares it to its own MST Configuration ID to determine whether it is in the same MST Region as the bridge that sent the MST BPDU. If the two MST Configuration IDs are the same, then the two bridges are in the same MST Region. If, however, the two MST Configuration IDs have at least one non-matching attribute, i.e., either different configuration names, different revision levels and/or different computed digests, then the bridge that received the BPDU concludes that it is in a different MST Region than the bridge that sourced the BPDU. A port of an MST bridge, moreover, is considered to be at the boundary of an. MST Region if the Designated Bridge is in a different MST Region or if the port receives legacy BPDUs.

FIG. 1 is a highly schematic block diagram of an MST BPDU 100 in accordance with IEEE Std. 802.1Q-2003. The MST BPDU 100 includes a header 102 compatible with the Media Access Control (MAC) layer of the respective LAN standard, e.g., Ethernet. The header 102 comprises a destination address (DA) field, a source address (SA) field, a Destination Service Access Point (DSAP) field, and a Source Service Access Point (SSAP), among others. The DA field carries a unique bridge multicast destination address assigned to the spanning tree protocol, and the DSAP and SSAP fields carry standardized identifiers assigned to the spanning tree protocol. Appended to header 102 is a BPDU message area that includes an "outer" part 104 and an "inner" part 106. The outer part 104 has the same format as an RSTP BPDU message and is recognized as a valid RSTP BPDU message by bridges that do not implement MSTP. The "inner" part 106 is utilized by bridges executing MSTP to establish the IST and the MSTIs. The inner part 106 has a set of spanning tree parameters, e.g., spanning tree priority vectors, for the IST, and a set of parameters for each MSTI supported by the bridge sourcing the MSTP BPDU 100.

Outer part 104, also referred to as the CIST priority vector, has a plurality of fields, including a protocol identifier (ID) field 108, a protocol version ID field 110, a BPDU type field 112, a CIST flags field 114, a CIST root ID field 116, a CIST external path cost field 118, a CIST regional root ID field 120, a CIST port ID field 122, a message age field 124, a maximum (MAX) age field 126, a hello time field 128, and a forward delay field 130. The CIST root identifier field 116 contains the identifier of the bridge assumed to be the root of the Common and Internal Spanning Tree, which may be in the same MSTP Region as the bridge sourcing the BPDU message 100, in another MSTP Region or in part of the bridged network that is not running MSTP. The CIST external path cost field 118 contains a value representing the lowest cost from the bridge sourcing the BPDU 100 to the CIST root identified in field 116 without passing through any other bridge in the same region as the bridge that is sourcing the BPDU message 100.

Inner part 106, also referred to as an MSTI priority vector, similarly has a plurality of fields, including a version 1 length field 132, which is typically set to null, a version 3 length field 136, an MST configuration ID field 138, a CIST internal root path cost field 140, a CIST bridge ID field 144, and a CIST remaining hops field 150. Inner part 106 may further include one or more optional MSTI configuration messages 152, each of which constitutes another MSTI priority vector or M-record.

Because version 2 of the RSTP does not specify any additional fields beyond those already specified by version 1, the MST BPDU does not have a version 2 length field.

As mentioned above, the MST configuration ID field 138 is made up of three subfields: a configuration name sub-field 154, a revision level sub-field 156 and an MD-5 checksum sub-field 158. The configuration name sub-field 154 carries a variable length text string encoded within a fixed size, e.g., 32-octets. The revision level sub-field 156 carries an integer encoded within a fixed field of two octets. The MD-5 checksum subfield 158 carries a 16-octet signature created by applying the MD-5 algorithm to the bridge's VLAN to MSTI table, which contains 4096 consecutive two octet elements.

Each MSTI Configuration Message 152 consists of a plurality of fields including a MSTI flags field 160, a MSTI regional root ID field 162, a MSTI internal root path cost field 164, a MSTI bridge priority field 166, a MSTI port priority field 168, and a MSTI remaining hops field 170. MST bridges utilize the STP parameters contained in fields 140-150 of inner part 106 and in each MSTI configuration message 152 to compute an active topology for each MSTI configured in the respective region.

The IEEE Std. 802.1Q-2003 supports the creation of up to 4K, i.e., 4096, different VLANs within a given network. However, in some network designs, it is desirable to create more than 4K broadcast domains. For example, very large Metropolitan Area Networks (MANs) can be created using L2 technology. These very large MANs may be used to provide communication services to hundreds or thousands of different customers. To keep the traffic from different customers separated, the MAN needs to establish more than 4K broadcast domains. The creation of large numbers of broadcast domains, however, poses problems for the operation of the Multiple Spanning Tree Protocol. Accordingly, a need exists for a system that can utilize the Multiple Spanning Tree Protocol, and can also support a very large number of broadcast domains.

SUMMARY OF THE INVENTION

Briefly, the invention relates to a system and method for running a multiple spanning tree protocol (MSTP) in a computer network having a large number of bridge domains. The computer network includes a plurality of intermediate network devices, such as bridges. Within each bridge, a plurality of bridge domains are defined. Each bridge domain corresponds to a different broadcast domain within the computer network, and is identified within a given bridge by two elements: (i) a Virtual Local Area Network (VLAN) Identifier (VID), and (ii) a set or collection of one or more ports of the given bridge. In the illustrative embodiment, each bridge supports 16K different bridge domains. For each port, the given bridge establishes a separate mapping of VIDs to Multiple Spanning Tree Instances (MSTIs), based on the bridge domains defined at the port. Each mapping is converted to a port-based configuration digest, which is then entered into MSTP control messages sent from the respective port. A bridge configured in accordance with the present invention will thus transmit MSTP control messages bearing different port-based configuration digests, depending on the port from which the control messages are being sent. Neighboring bridges use the port-based configuration digests from received MSTP BPDUs to establish regions within the computer network that share a common port-based configuration digest value.

In accordance with a preferred embodiment of the invention, the port-based configuration digest for each port is derived from information specified in a plurality of tables. In particular, for each port, a Bridge Domain to VID table is established. For each Bridge Domain configured at the port, the VID used to define that Bridge Domain is mapped thereto in the port's Bridge Domain to VID table, which is a one-to-one mapping of VIDs to Bridge Domains at the port. In addition, a Global Bridge Domain to VID table and a Global Bridge Domain to Multiple Spanning Tree Instance (MSTI) table are defined. The Global Bridge Domain to VID table provides a mapping of VIDs to every Bridge Domain established at the bridge. The first 4K of Bridge Domains, i.e., 1-4095, in the Global Bridge Domain to VID table are identified with (or mapped to) the 4K VIDS, i.e., 1-4095. This mapping is fixed. The Global Bridge Domain to MSTI table maps each Bridge Domain to a corresponding MSTI. Based on the information contained in these tables, a per-port mapping of VIDs to MSTIs is generated.

To map VIDs to MSTIs, a distinction is made between those VIDs that are used to define one of the port's bridge domains, and those VIDs that are not used to define any of the port's bridge domains. In particular, for a VID that is used in defining one of the port's bridge domains, the VID maps to one Bridge Domain in the port's Bridge Domain to VID table. The MSTI associated with that bridge domain, as reflected in the Global Bridge Domain to MSTI table, is then retrieved and selected for that VID. For a VID that is not used to define any of the bridge domains at the port, the bridge domain associated with that VID is first obtained from the Global Bridge Domain to VID table, using just the first 4K VID entries. Then, a lookup is performed on the Global Bridge Domain to MSTI table using the obtained bridge domain in order to derive a matching MSTI, which is then selected as the MSTI for this VID. In this way, a mapping of VIDs to MSTIs is established for each port.

A port-based configuration digest is then computed for each port based on the particular MSTI to VID selections for that port. This port-based configuration digest is then loaded into MSTP control messages transmitted from the respective port. Received MSTP control messages are evaluated, and their configuration digests are compared with the configuration digest computed for the port on which the MSTP control message was received. If the two configuration digest values are the same, then the two neighboring ports are considered to be in the same MSTP region. If the two values are not the same, then the two ports are considered to be in different regions.

BRIEF DESCRIPTION OF THE DRAWINGS

The invention description below refers to the accompanying drawings, of which:

FIGS. 6-9 are illustrations of preferred data structures for use with the present invention.

DETAILED DESCRIPTION OF AN ILLUSTRATIVE EMBODIMENT

Figure 2:
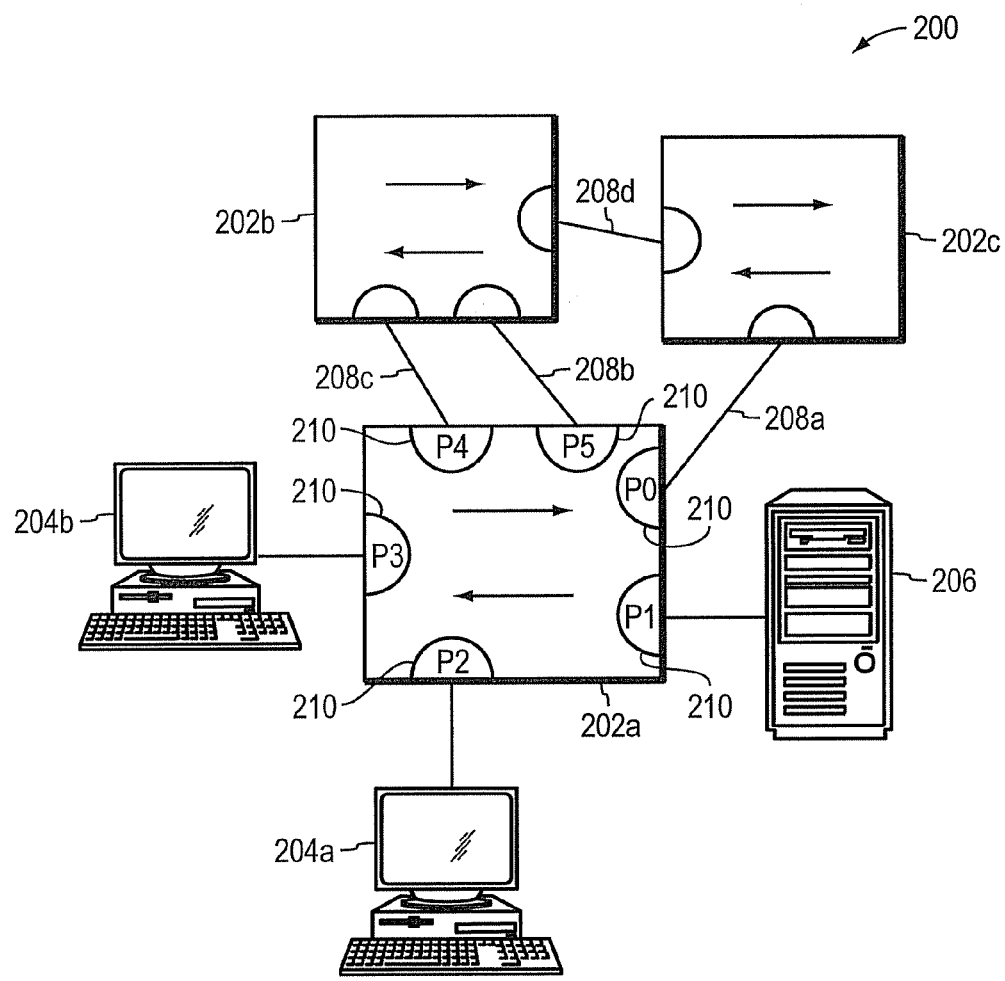
FIG. 2 is a highly schematic illustration of a bridged network in accordance with a preferred embodiment of the present invention.

FIG. 2 is a highly schematic block diagram of an illustrative computer network 200 in which the present invention may be advantageously employed. Network 200 includes a plurality of interconnected intermediate network devices 202-c. Devices 202a-c are preferably bridges. In the illustrative embodiment, bridges 202a-c conform to IEEE Std. 802.1D-2003 and IEEE Std. 802.1Q-2003, which are hereby incorporated by reference in their entireties. Attached to the bridges 202a-c are network entities, such as local area networks (LANs) and/or end stations. In particular, workstations 204a-b and server 206 are directly attached to bridge 202a. The bridges 202a-c, moreover, are interconnected with each other by a plurality of links 208a-d, which may be shared media or point-to-point links.

Each bridge 202 has a plurality of ports 210 for receiving and forwarding messages across the network 200. The ports of each bridge 202, moreover, may be identified, e.g., by port numbers, such a Port 0 (P0), Port 1 (P1), Port 2 (P2), etc., so that the entities that can be reached by a respective bridge can be associated with the particular port used to reach them. Bridge ports that are coupled directly to end stations or LANs and to which no neighboring bridge is coupled are referred to as "access ports". Bridge ports 210 that connect to one or more neighboring bridged are referred to as "trunk ports".

Figure 3:
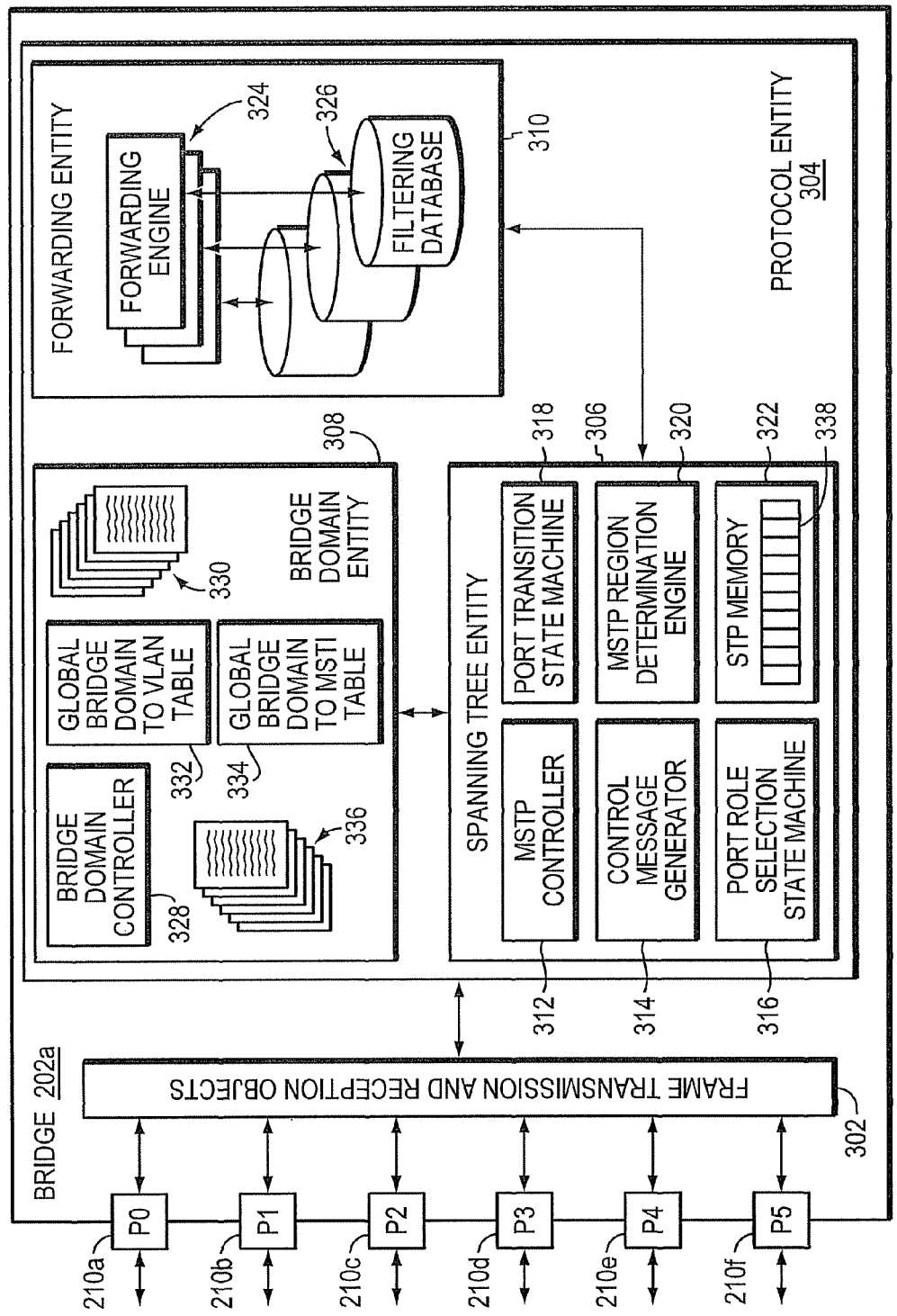
FIGS. 3 and 4 are partial block diagrams of an intermediate network device in accordance with a preferred embodiment of the present invention.

It should be understood that the network 200 of FIG. 3 is meant for illustrative purposes only, and that the present invention will operate with other networks having possibly far more complex topologies.

As shown, network 200 includes a loop. Execution of a spanning tree protocol, such as the Spanning Tree Protocol defined in IEEE Std. 802.1D-2003, prevents loops by defining a loop-free topology (i.e., an active topology) in the bridged network 200. It also allows the ports 210 that are part of the active topology to transition rapidly to a forwarding state so that network messages can be forwarded with minimal disruption and/or delay. Furthermore, execution of the Multiple Spanning Tree Protocol (MSTP), as defined in IEEE Std. 802.1Q-2003, establishes a plurality of active topologies, each are associated with a Multiple Spanning Tree Instance. However, as set forth above, IEEE Std. 802.1Q-2003, including the MSTP, supports at most $2^{12}$ or 4K different VLANS. In some network situations, it is desirable to define more than 4K bridge domains, but still run a multiple spanning tree protocol. The present invention achieves this objective.

FIG. 3 is a partial, highly schematic block diagram of bridge 202a. As indicated above, it has a plurality of ports 210a-f each of which is preferably identified by a number (e.g., P0-P5). Bridge 202a further includes one or more frame transmission and reception objects, designated generally 302 that are associated with the ports 210a-f such that network messages, including data and control frames, received at a given port, e.g., P1, may be captured, and frames to be transmitted by bridge 302b may be delivered to a given port, e.g., P2. Frame reception and transmission objects 302 are preferably message storage structures, such as priority queues.

Bridge 202a also includes at least one protocol entity 304 that is in communicating relationship with the frame transmission and reception objects 302, and that comprises a plurality of components. In particular, the protocol entity 304 includes at least one spanning tree entity 306, a bridge domain entity 308, and a forwarding entity 310. The spanning tree entity 306 preferably comprises a plurality of subcomponents, including a multiple spanning tree protocol (MSTP) controller 312, a control message generator 314, a port role selection state machine 316, a port transition state machine 318, a MSTP region determination engine 320, and a spanning tree protocol (STP) memory 322. The spanning tree entity 306 operates generally in compliance with the IEEE 802.1S Multiple Spanning Tree Protocol (MSTP) supplement to the IEEE Std. 802.1Q-2003, which is hereby incorporated by reference in its entirety, as modified by the present invention. Memory 322 is preferably organized to include a plurality of records or cells for storing spanning tree related information or parameters, such as the bridge's numeric bridge identifier (ID), the assigned path cost for each port 310a-c, the current or "best" spanning tree information for each port P0-P5, etc. Memory 322 may be a volatile and/or non-volatile random access memory (RAM) or some other memory device.

The forwarding entity 310 includes one or more forwarding engines 324. Each forwarding engine 324 is preferably coupled to a corresponding filtering database 326 that stores address information corresponding to the entities of network 200 (FIG. 2). Each filtering database 326 preferably has a plurality of records (not shown) each containing a plurality of cells, including a destination address cell, a destination port cell and a corresponding timer cell. Each record in the filtering databases 326 preferably corresponds to a particular network entity.

The forwarding engines 324 are configured to switch or bridge messages, such as packets and/or frames, from a source port 210 to one or more destinations ports 210 depending on information contained in the appropriate forwarding database 326, and also depending on the spanning tree port states of the respective ports 210, as managed by spanning tree entity 306, and on the bridge domains established at the ports. The forwarding entity 310 is in communicating relationship with the spanning tree entity 306, and may relay control messages, such as MSTP bridge protocol data unit (BPDU) control messages, received at ports 210 thereto.

Figure 1:
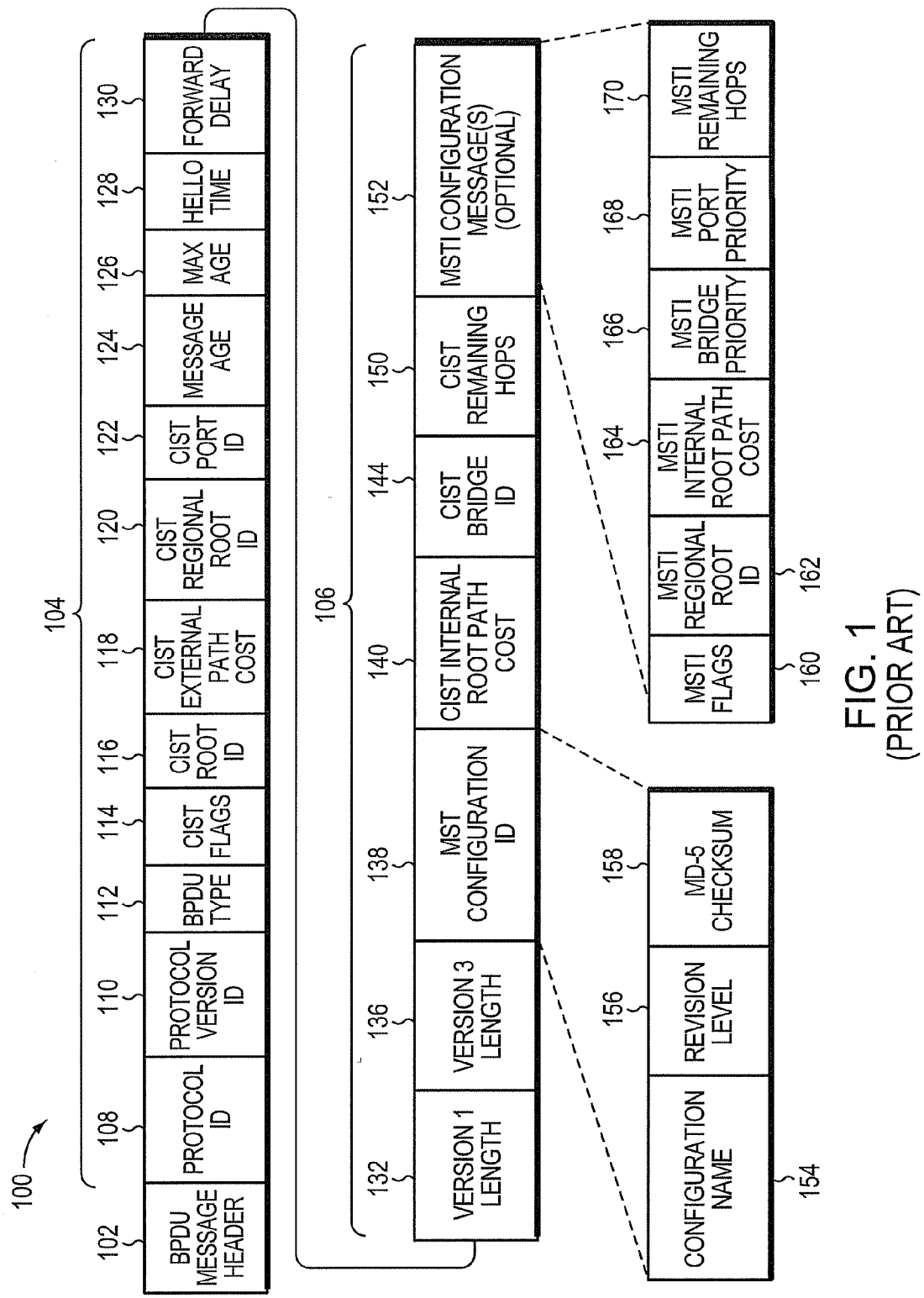
FIG. 1, previously discussed, is a schematic block diagram of a conventional configuration bridge protocol data unit in accordance with the Multiple Spanning Tree Protocol.

The bridge domain entity 308 also includes a plurality of subcomponents. In particular, the bridge domain entity 308 preferably includes a bridge domain controller 328, a plurality of per-port Bridge Domain to VLAN mappings, indicated generally at 330, a Global Bridge Domain to VLAN table 332, a Global Bridge Domain to MSTI table 334, and a plurality of per-port VLAN to MSTI tables, indicated generally at 336. In the illustrative embodiment, there is one Bridge Domain to VLAN mapping 330, and one VLAN to MSTI table 336 for each port 210 of bridge 202a. Each VLAN to MSTI table 336, moreover, contains a mapping of VLAN IDs to MSTIs, and is used to derive the value loaded into the MD-5 checksum field 158 (FIG. 1) of MSTI BPDU messages sent from the respective port. As each port 210 is provided with its own mapping of VLAN IDs to MSTIs, a different configuration digest can be established for each port 210.

Those skilled in the relevant art will understand that the bridge domain entity 308 may be disposed at other locations. For example, it may be distributed across the ports 210a-f or subsumed in the spanning tree entity 306. Those skilled in the relevant art will further understand that bridge 202a and protocol entity 304 may include other entities and engines. The bridge domain entity 308 may also be configured with additional subcomponents, such as VLAN controller for tagging messages to be sent from bridge 202a with a VLAN ID, and for examining the VLAN IDs of received messages.

Figure 4:
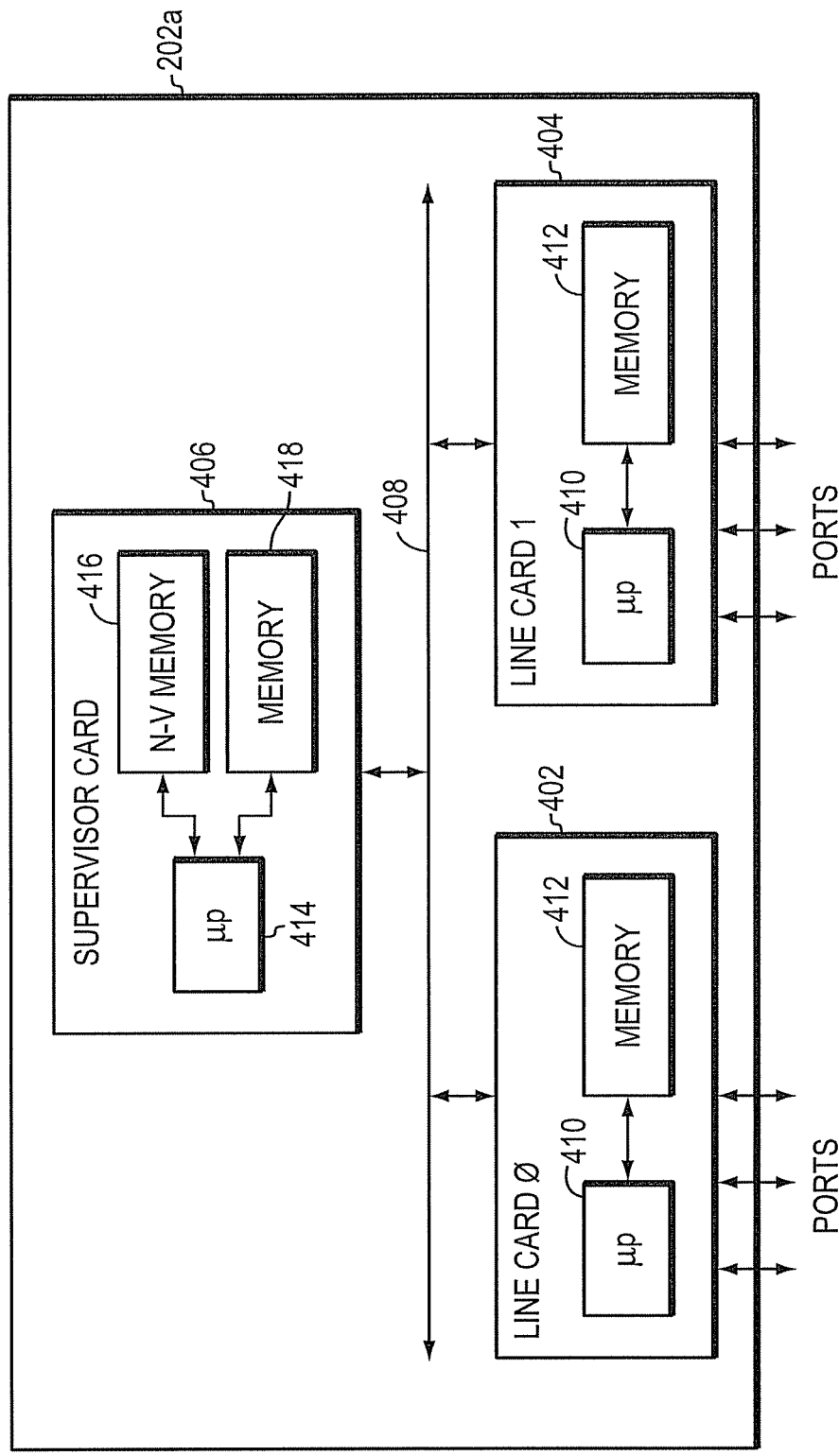

In the illustrated embodiment, bridge 202a includes transmitting and receiving circuitry, including one or more line cards and/or network interface cards (NICs) establishing ports for the exchange of network messages, one or more supervisor cards having central processing units (CPUs) and/or microprocessors and associated memory devices for performing computations and storing the results therefrom and one or more bus structures. FIG. 4 is another highly schematic, partial block diagram of bridge 202a illustrating such components. As shown in FIG. 4, bridge 202a includes a plurality of line cards 402 and 404, and a supervisor card 406. Cards 402, 404 and 406 are in communicating relationship with each other through a communication bus 408. Each of the line cards 402 and 404 includes a microprocessor (μP) 410 and at least one memory 412. The supervisor card 406 also includes a μP 414, as well as both a non-volatile (N-V) memory 416 and a volatile memory 418, e.g., RAM.

Referring again to FIG. 3, it will be understood by those skilled in the art that the spanning tree entity 306, the bridge domain entity 308, and the forwarding entity 310 may each comprise registers and combinational logic configured and arranged to produce sequential logic circuits. In the illustrated embodiment, the spanning tree entity 306, the bridge domain entity 308, and the forwarding entity 310 are preferably software modules or libraries containing program instructions pertaining to the methods described herein and executable by one or more processing elements, such as the microprocessors 410 and/or 414 (FIG. 4), of bridge 202a. Other computer readable media may also be used to store and execute these program instructions. Nonetheless, those skilled in the art will recognize that various combinations of software and hardware, including firmware, may be utilized to implement the present invention.

Suitable intermediate network device platforms for use with the present invention include, but are not limited to, the commercially available series of switches from Cisco Systems, Inc. of San Jose, Calif., such as the Catalyst 4000 and 6000.

Figure 5A:
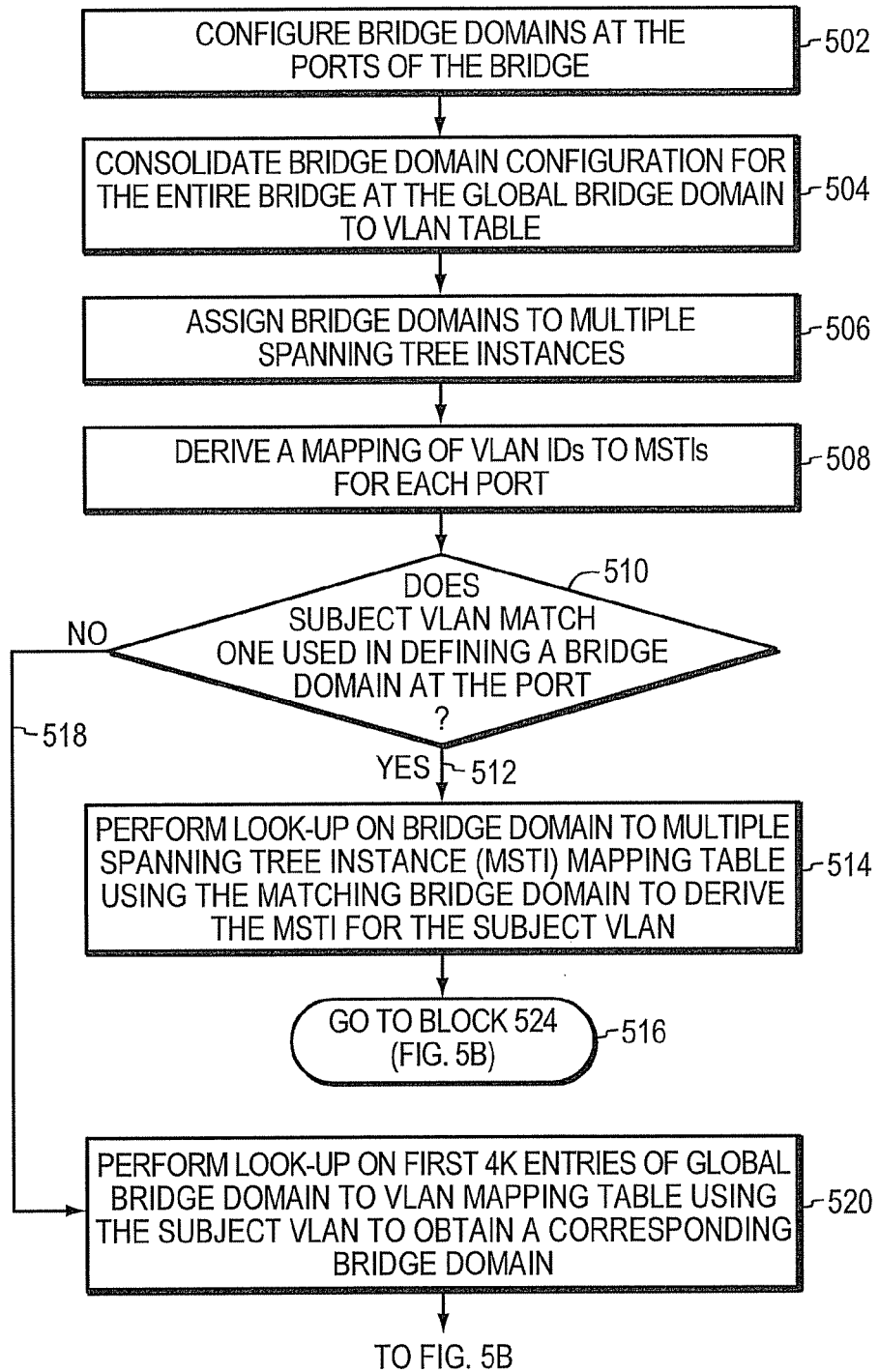
FIG. 5 is a flow diagram of a preferred method in accordance with the present invention.
Figure 5B:
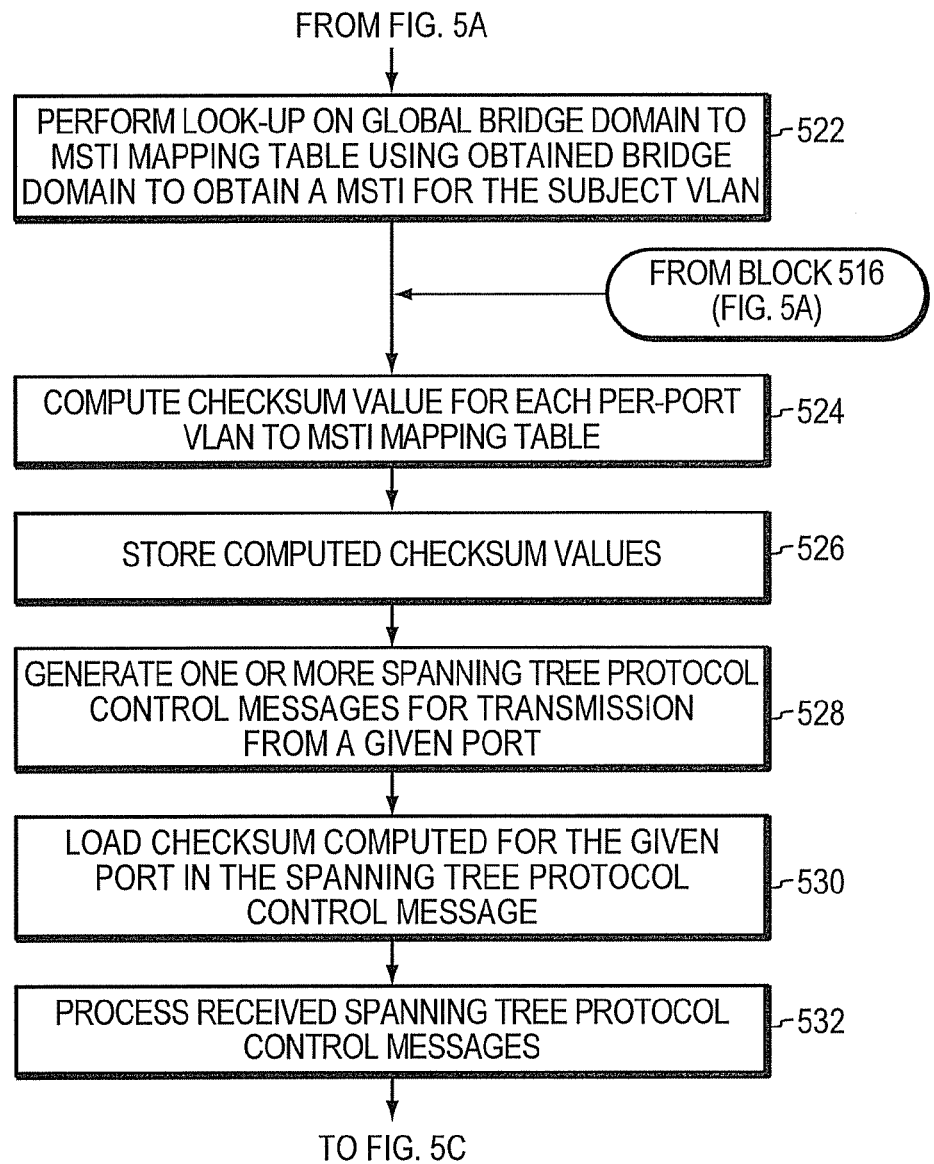
Figure 5C:
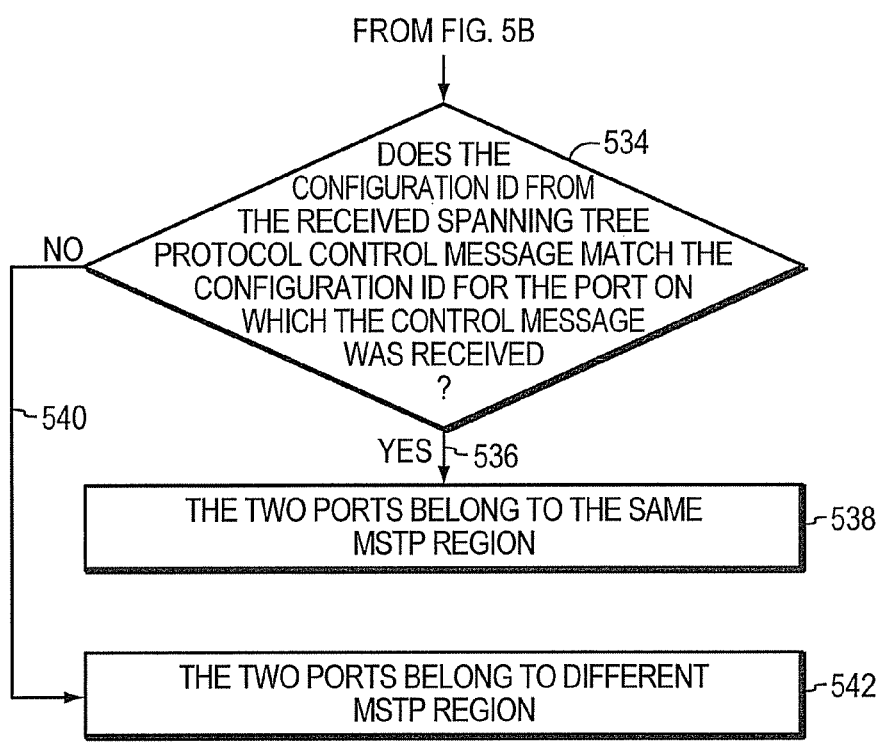

FIG. 5A-C is a flow diagram of a preferred method in accordance with the present invention. First, the network administrator creates the desired bridge domains at the ports 210 of bridge 202a, as indicated at block 502 (FIG. 5A). As indicated above, a bridge domain is defined by a VLAN ID and one or more ports. Therefore, the network administrator creates a bridge domain by assigning it a selected VLAN ID and one or more ports 210 of bridge 202a. As indicated above, the bridge domain entity 308 includes a separate Bridge Domain to VLAN mapping 330 for each port 210. Each Bridge Domain to VLAN mapping 330 stores the bridge domains established at the respective port 210, as well as the VLAN IDs that were used to establish those bridge domains.

FIG. 6 illustrates an exemplary Bridge Domain to VLAN mapping 330a for a given port, such as port 210a. Mapping 330a is preferably organized as a table having a plurality of column's and a plurality of rows whose intersections define cells for storing information. In particular, table 330a has a Bridge Domain column 602, a VLAN ID column 604, and one or more rows 606. Suppose that the network administrator wishes to establish Bridge Domains 8001 to 8003, and 12094 to 12096 at port 210a. Suppose further that these Bridge Domains are to correspond to VLAN IDs 1, 2, 3, 4094, 4095, and 4096, respectively. Then, table 330a, which corresponds to port 210a, is configured with this association of Bridge Domains to VLAN IDs. The association of Bridge Domains to VLAN IDs is preferably performed by a network administrator who causes the cells of table 330a to be configured. Techniques for configuring information at a bridge are well-known to those skilled in the relevant art. For example, the network administrator may use a Command Line Interface (CLI) to program or configure the bridge 202a. In the illustrative embodiment, the only bridge domains included in table 330a are the bridge domains being defined at port 210a.

After the desired bridge domains have been created at each port 210, the association of bridge domains to VLAN IDs for the entire bridge 202a is aggregated and stored at the Global Bridge Domain to VLAN table 332, as indicated at block 504.

FIG. 7 illustrates an exemplary Global Bridge Domain to VLAN table 332. Table 332 has a plurality of columns and rows whose intersections define cells for storing information. Specifically, table 332 has a Bridge Domain column 702 and a VLAN ID column 704. It also has a plurality of rows 706. In the illustrative embodiment, bridge 202a supports $2^{14}$ (also referred to as 16K) different bridge domains, each of which is given a unique identifier, such as Bridge Domain IDs 1 through 16384. Table 332 has a row for each Bridge Domain ID, and the cells defined by the Bridge Domain column 702 contain these Bridge Domain IDs. The cells defined by the VLAN ID column 704 contain the VLAN IDs assigned to the respective Bridge Domain IDs of column 702. In accordance with the preferred embodiment of the present invention, VLAN IDs 1 through 4096 are mapped, one-for-one, to Bridge Domain IDs 1 through 4096, as illustrated in table 332. Furthermore, these mappings are fixed, and cannot be modified by the user, e.g., the network administrator. Bridge Domain IDs 4097 through 16384 are associated with the VLAN IDs corresponding to those Bridge Domains as configured at all of the ports 210 of bridge 202a. In other words, the network administrator is free to assign Bridge Domain IDs 4097 through 16384 to the ports 210 of bridge 202a as desired.

As mentioned above, Bridge Domain IDs 8001, 8002, 8003, 12094, 12095 and 12096 have been assigned to port 202a and to VLAN IDs 1, 2, 3, 4094, 4095 and 4096, respectively. Accordingly, table 330 is configured with these mappings. Suppose also that Bridge Domain IDs 4097, 4098 and 4099 have been assigned to a different port, e.g., port 210b, and to VLAN IDs 1, 2, and 3, respectively. Then, table 330 is also configured with these mappings of Bridge Domain IDs to VLAN IDs, as shown. Any unused Bridge Domain IDs, such as Bridge Domain IDs 16382, 16383 and 16384, are not assigned any corresponding VLAN ID in table 332, as shown.

As the Global Bridge Domain to VLAN table 332 incorporates the mapping of VIDs to Bridge Domains at each port, those skilled in the relevant art will recognize that the port Bridge Domain to VLAN tables 330 could be omitted, and replaced simply with a list of Bridge Domains defined at each port. Those skilled in the relevant art will further recognize that VLAN IDs and bridge domain IDs may range from 0 to 4095, and from 0 to 16383, respectively.

Next, the network administrator assigns Multiple Spanning Tree Instances (MSTIs) to the bridge domains that have been established at bridge 202a, as indicated at block 506. Only one MSTI is assigned to any given bridge domain. This information is preferably stored by the bridge 202a at its Global Bridge Domain to MSTI table 334.

FIG. 8 illustrates an exemplary Global Bridge Domain to MSTI table 334, which has a plurality of columns and rows whose intersections define cells for storing information. Specifically, table 334 has a Bridge Domain column 802, a Multiple Spanning Tree Instance (MSTI) column 804, and a plurality of rows 806, one for each Bridge Domain ID. When table 334 is first initialized, the cells of column 802 contain Bridge Domain IDs 1 through 16384, and the cells of column 804 are all set to MSTI 0. The network administrator then assigns Bridge Domain IDs to particular MSTIs by populating the cells of column 804. Suppose, for example, that Bridge Domain IDs 1 through 4 are assigned to MSTI 2, that Bridge Domain IDs 5 and 6 are assigned to MSTI 6, and that Bridge Domain IDs 4097 and 4098 are assigned to MSTI 16. Suppose also that Bridge Domain IDs 4099, and 8001 to 8003 are assigned to MSTIs 17, 42, 43 and 44, respectively, and that Bridge Domain IDs 12094 to 12096 are assigned to MSTI 40. Then, table 332 is configured with this information, as indicated in FIG. 8, preferably through network administrator action. Bridge Domain IDs that have not been assigned to any particular MSTI remain associated with MSTI 0 by default.

The next step following the creation of tables 330, 332, and 334 is the creation of the VLAN to MSTI mapping table for each port 210, as indicated at block 508. In the preferred embodiment, this mapping of VLAN IDs to MSTIs is preferably performed by the bridge domain controller 328 based on the information contained in tables 330, 332 and 334.

FIG. 9 illustrates an exemplary VLAN to MSTI mapping table 336a for a given port, such as port 210a. Table 336a has a VLAN ID column 902, an MSTI column 904 and a plurality of rows 906. The cells corresponding to column 902 are preferably configured with VLAN IDs 1 through 4096. The cells corresponding to column 904 are preferably configured with the MSTIs derived for the respective VLAN IDs of column 902.

To derive the MSTI for a subject VLAN, the controller 328 first determines whether the subject VLAN has been used in defining one of the Bridge Domains at the port under consideration, as indicated by decision block 510. If so, the controller 328 performs a lookup on the Global Bridge Domain to MSTI table 332 using this Bridge Domain as an index so as to derive a corresponding MSTI for the subject VLAN, as indicated by Yes arrow 512 leading to block 514. This MSTI is then entered into the port's VLAN to MSTI mapping table 336a for the subject VLAN. Processing then continues at block 524 (FIG. 5B) as indicated by Go To block 516. If the subject VLAN has not been used to define any of the Bridge Domains at the port, controller 328 performs a lookup on the first 4K entries of the Global Bridge Domain to VLAN table 332 using the subject VLAN as an index so as to obtain a matching Bridge Domain, as indicated by No arrow 518 leading to block 520. Using this obtained bridge domain as an index, a lookup is then performed on the Global Bridge Domain to MSTI table 334 to derive a corresponding MSTI, as indicated at block 522 (FIG. 5B). This MSTI is then entered into the port's VLAN to MSTI mapping table 336a for the subject VLAN.

Considering port 210a and VLAN 1, controller 328 determines that this VLAN has been used in establishing Bridge Domain 8001. Accordingly, controller 328 performs a lookup on table 330 using Bridge Domain 8001 to derive the appropriate MSTI for this VLAN, i.e., VLAN 1. As shown in table 330, Bridge Domain 8001 maps to MSTI 42. Accordingly, controller 328 enters this instance, i.e., 42, into the row of table 334a for VLAN 1. Similarly, controller 328 determines that VLANs 2 and 3 were used to establish Bridge Domains 8002 and 8003 at port 210a. Accordingly, controller 328 performs a lookup on table 330 using these two Bridge Domains to derive the MSTIs for VLANs 2 and 3, i.e., MSTIs 43 and 44.

Controller 328 next determines that VLAN 4 has not been used to establish any Bridge Domains at port 210a. Accordingly, in this case, controller 328 performs a lookup on the first 4K entries of the Global Bridge Domain to VLAN table 332 to determine which Bridge Domain corresponds to VLAN 4, and finds that VLAN ID 4 maps to Bridge Domain 4. Controller 328 then performs a lookup on Global Bridge Domain to MSTI table 334 using the obtained Bridge Domain to ascertain the MSTI for VLAN 4. As shown in FIG. 8, Bridge Domain 4 is associated with MSTI 2. Accordingly, controller 328 enters this MSTI, i.e., MSTI 2, in table 336a for VLAN 4. This same process is repeated for VLANs 5 through 4093, as none of these VLANs have been used to establish any of the bridge domains at port 210a.

As the first 4K bridge domains are mapped, one-for-one, to the 4K VLANs, controller 328 may simply use the subject VLAN in place of the bridge domain as an index directly to table 334, and skip the first step of doing a lookup on table 332.

The next-VLAN, VLAN ID 4094, however, is used at port 210a to establish bridge domain 12094. Accordingly, in this case, controller 328 once again derives the MSTI that has been associated with bridge domain 12094, as reflected in table 334. Here, MSTI 40 has been associated with this bridge domain. Accordingly, controller 328 enters this derived MSTI, i.e., MSTI 40, in table 336a for VLAN 4094. Similarly, VLANs 4095 and 4096 have been used at port 210a to establish bridge domains 12095 and 12096, respectively. Accordingly, controller 328 performs a lookup on table 334 to derive the MSTIs associated with these two bridge domains. Controller 328 determines that these two bridge domains map to MSTI 40. Accordingly, controller 328 enters MSTI 40 in the rows of table 336a that correspond to VLANs 4095 and 4096. In this way, controller 328 derives a mapping of each VLAN ID, i.e., VLAN IDs 1 through 4096, to a respective MSTI for port 210a.

Controller 328 performs this process for each port 210 of bridge 202a, thereby deriving a mapping of VLANs to MSTIs for each port 210. Because the different ports 210 of bridge 202a use different VLANs to establish the bridge domains at those ports, the mapping of VLANs to MSTIs will typically differ for each port 210a. For example, at port 210a VLAN 1 is mapped to MSTI 42, because VLAN 1 is used at port 210a to establish bridge domain 8001. However, at port 210b, VLAN 1 will be mapped to MSTI 16, because at this port VLAN 1 is used to establish bridge domain 4097, and bridge domain 4097 has been assigned to MSTI 16, as indicated in the Global Bridge Domain to MSTI table 334.

Once the VLAN to MSTI mapping tables 336 have been derived for the ports 210, the contents of these tables are used to derive the MD-5 Checksum value for use in MSTP BPDUs transmitted from the ports 210, as indicated at block 524. In particular, the MD-5 hashing algorithm is applied to the contents of each per-port VLAN to MSTI mapping table 336 to derive a corresponding checksum value. In the preferred embodiment, this process is performed by the MSTP controller 312. Nonetheless, those skilled in the art will recognize that it may be performed by other components, such as the bridge domain controller 328. The checksum value computed for each port 210 is then stored, as indicated at block 526. In the preferred embodiment, the plurality of checksum values are stored at the STP memory 332 in a corresponding data structure 338 (FIG. 3).

The control message generator 314 of the Spanning Tree Entity 306 then generates one or more MSTP BPDU messages 100 (FIG. 1) for transmission from the ports 210 of bridge 202a, as indicated at block 528. In the MD-5 checksum field 158, the control message generator 314 preferably loads the value computed for the port 210 from which the MSTP BPDU messages will be sent, as indicated at block 530. That is, for MSTP BPDU messages sent from port 210a, control message generator 314 uses the checksum value generated for port 210a. For messages sent from port 210b, control message generator 314 uses the checksum value generated for port 210b, and so on. The remaining fields of control message 100 are preferably loaded in the well-known manner. The MSTP BPDU messages are then transmitted from the ports.

MSTP BPDU messages 100 that are received at the ports 210 of bridge 202a are passed to the Spanning Tree Entity 306 for processing, as indicated at block 532. As part of this processing, the MSTP Region Determination Engine 320 compares the checksum from field 158 of received MSTP BPDU messages 100, with the checksum computed for the port 210 on which that MSTP BPDU message 100 was received, as indicated by decision block 534 (FIG. 5C). If the two values are the same, the MSTP controller 312 concludes that the port of the neighboring bridge is in the same region as its port, as indicated by Yes arrow 536 leading to block 538. If the two values are not the same, the MSTP controller 312 concludes that its port is in a different region from the port of the neighboring bridge, as indicated by No arrow 540 leading to block 542.

As a result, two neighboring bridges that are coupled by more than one link, such as bridges 202a and 202b, may be in the same region for some ports, but in different regions for other ports.

As set forth herein, bridges 202 of network 200 are configured to create several active topologies across network 200, where each active topology corresponds to a multiple spanning tree instance (MSTI). The bridges 202 of network 200, moreover, support the creation of more than 4K bridge domains within network 200. And, by virtue of the present invention, two bridge domains can be assigned to different MSTIs, even though the two bridge domains are identified by the same VLAN ID.

Those skilled in the relevant art will understand that the invention may be performed in other or different ways, including a different order of the steps and/or different steps. In addition, the creation of bridge domains need not be performed at every port.

The foregoing description has been directed to specific embodiments of this invention. It will be apparent, however, that other variations and modifications may be made to the described embodiments, with the attainment of some or all of their advantages. For example, other data structures besides tables may be used to implement the present invention. Alternatively, two or more of the tables may be combined. Therefore, it is an object of the appended claims to cover all such variations and modifications as come within the true spirit and scope of the invention.

What is claimed is:

1. In an intermediate network device having a plurality of ports for forwarding network messages within a bridged network, a method for establishing a plurality of active topologies within the bridged network, each active topology associated with a corresponding Multiple Spanning Tree Instance (MSTI), the method comprising:

defining a plurality of bridge domains within the intermediate network device, each bridge domain corresponding to a different broadcast domain, and defined by one Virtual Local Area Network (VLAN) Identifier (ID) and at least one port of the intermediate network device;

for each port of the intermediate network device at which a bridge domain has been defined, providing a separate mapping of VLAN IDs to MSTIs at the respective port, wherein a first port having a first mapping of VLAN IDs to MSTIs maps a first VLAN ID to a first MSTI and a second port having a second mapping of VLAN IDs to MSTIs maps the first VLAN ID to a second MSTI that is different than the first MSTI;

deriving a value from the mapping of VLAN IDs to MSTIs for a selected port; and loading the deriving value into Spanning Tree Protocol (STP) control messages transmitted from the selected port, wherein the STP control messages transmitted from the selected port include different derived values than STP control messages transmitted from one or more other ports of the intermediate network device.

2. The method of claim 1 further comprising mapping at least the bridge domains defined at the intermediate network device to a corresponding MSTI, wherein the mapping of VLAN IDs to MSTIs for the selected port is based at least in part on the mapping of bridge domains to MSTIs.

3. The method of claim 1 wherein
the STP control message includes a configuration identifier (ID) field, and
the derived value is loaded into the configuration ID field of the STP control message.

4. The method of claim 3 wherein the derived value is obtained by computing an MD-5 checksum on the mapping of VLAN IDs to MSTIs for the selected port.

5. The method of claim 1 further comprising:
storing the value derived for the selected port;
receiving, at the selected port, at least one STP control message as transmitted by a port of a neighboring intermediate network device, the at least one received STP control message including a derived value;
comparing the derived value from the at least one received STP control message with the derived value stored for the selected port; and
if the two derived values are the same, assigning the selected port and the port of the neighboring intermediate network device to a single Multiple Spanning Tree Protocol (MSTP) region.

6. The method of claim 5 further comprising, if the two derived values are not the same, assigning the selected port and the port of the neighboring intermediate network device to different MSTP regions.

7. The method of claim 1 further comprising:
providing the intermediate network device with a mapping of bridge domains to MSTIs; and
providing the intermediate network device with a mapping of bridge domains to VLAN IDs for all ports of the bridge, and
wherein the providing the separate mapping of VLAN IDs to MSTIs at the respective port comprises:
if a given VLAN ID is one that is associated with a bridge domain at the respective port, then the MSTI mapped to that bridge domain is used as the MSTI for the given VLAN ID in the separate mapping of VLAN IDs to MSTIs for the respective port,
if the given VLAN ID is not one associated with a bridge domain at the respective port, (i) perform a lookup on the bridge domain to VLAN ID mapping using the given VLAN ID as index so as to return a matching BD, (ii) perform a lookup on the bridge domain to MSTI mapping using the returned matching bridge domain as an index so as to return a matching MSTI, and (iii) use the returned matching MSTI in the separate mapping of VLAN IDs to MSTIs for the respective port.

8. The method of claim 7 wherein
the intermediate network device supports 4096 different VLAN IDs and more than 4096 different bridge domains,
in the mapping of VLAN IDs to bridge domains, the first 4096 VLAN IDs are mapped, one-for-one, to the first 4096 bridge domains, and
the lookup performed on the bridge domain to MSTI mapping using the returned matching bridge domain as an index is limited to the first 4096 bridge domains.

9. The method of claim 8 wherein the intermediate network device supports 16384 bridge domains.

10. An intermediate network device configured to receive and forward network messages within a computer network, the intermediate network device comprising:
a plurality of ports for connecting the device to one or more network entities;
a bridge domain entity configured to store a plurality of bridge domains defined at the intermediate network device, each bridge domain corresponding to a different broadcast domain corresponding to a Virtual Local Area Network (VLAN) Identifier (ID) and one or more ports; and
a spanning tree entity configured to send Spanning Tree Protocol (STP) control messages from the ports, and to process STP control messages received at the ports, to establish a plurality of Multiple Spanning Tree Instances (MSTI) within the computer network, wherein a first port having a first mapping of VLAN IDs to MSTIs maps a first VLAN ID to a first MSTI and a second port having a second mapping of VLAN IDs to MSTIs maps the first VLAN ID to a second MSTI that is different than the first MSTI.

11. The intermediate network device of claim 10 wherein the spanning tree entity derives a respective value for each mapping of VLAN IDs to MSTIs of the at least two ports and, for a given port, loads the value derived for the given port into STP control messages sent from the given port.

12. The intermediate network device of claim 11 wherein the STP control messages have a configuration identifier (ID) field, and the derived value for the given port is loaded into the configuration ID field of the STP control messages sent from the given port.

13. The intermediate network device of claim 10 wherein the bridge domain entity includes a mapping of bridge domains to MSTIs for the intermediate network device, and a mapping of bridge domains to VLAN IDs for each of the at least two ports, and
the mapping of VLAN IDs to MSTIs for one of the at least two ports is based, at least in part, on the mapping of bridge domains to VLAN IDs for the one port.

14. The intermediate network device of claim 10 wherein the bridge domain entity includes:
a Global bridge domain to VLAN ID table that maps all of the bridge domains at the intermediate network device to a corresponding VLAN ID,
a Global bridge domain to MSTI table that maps each bridge domain to a corresponding MSTI, and
for each of the at least two ports, a respective VLAN ID to MSTI table that maps each VLAN ID to a corresponding MSTI.

15. The intermediate network device of claim 14 wherein, in the Global bridge domain to VLAN ID table, the first 4096 VLAN IDs are mapped, one-for-one, to the first 4096 bridge domains.

16. The intermediate network device of claim 11 wherein the spanning tree entity assigns the at least two ports to a respective Multiple Spanning Tree Protocol (MSTP) region depending on the mapping of VLAN IDs to MSTIs of the at least two ports.

17. The intermediate network device of claim 16 wherein STP control messages received by the intermediate network device include a derived value, and the spanning tree entity:
compares the derived value from STP control messages received from a remote port of a neighboring intermediate network device with the derived value for the port at which the STP control messages are received, and
if the two derived values are the same, assigns the remote port and the port at which the STP control messages are received to a single MSTP region.

18. A bridge configured to receive and forward network messages within a computer network, the bridge comprising:
a plurality of ports for connecting the bridge to one or more network entities disposed within the computer network;
means for establishing a plurality of bridge domains at the ports, wherein each bridge domain is a different broadcast domain, and defined by a Virtual Local Area Network (VLAN) Identifier (ID) and one or more ports;
means for mapping the bridge domains established at the ports of the bridge to corresponding Multiple Spanning Tree Instances (MSTIs); and
means for establishing a separate mapping of VLAN IDs to MSTIs for at least two ports of the bridge, wherein a first port having a first mapping of VLAN IDs to MSTIs maps a first VLAN ID to a first MSTI and a second port having a second mapping of VLAN IDs to MSTIs maps the first VLAN ID to a second MSTI that is different than the first MSTI.

19. The bridge of claim 18 further comprising:
means for computing a respective digest value from the mapping of VLAN IDs to MSTIs for each of the at least two ports; and
means for loading the digest value computed for a selected one of the at least two ports into Spanning Tree Protocol (STP) control messages sent from the selected port.

20. The bridge of claim 19 further comprising:
means for comparing the digest value computed for the selected port with a digest value contained in a STP control message received at the selected port from a remote port of a neighboring bridge; and
means for assigning the selected port and the remote port to a single Multiple Spanning Tree Protocol (MSTP) region, provided that the two digest are the same.

* * * * *